Figure 1:
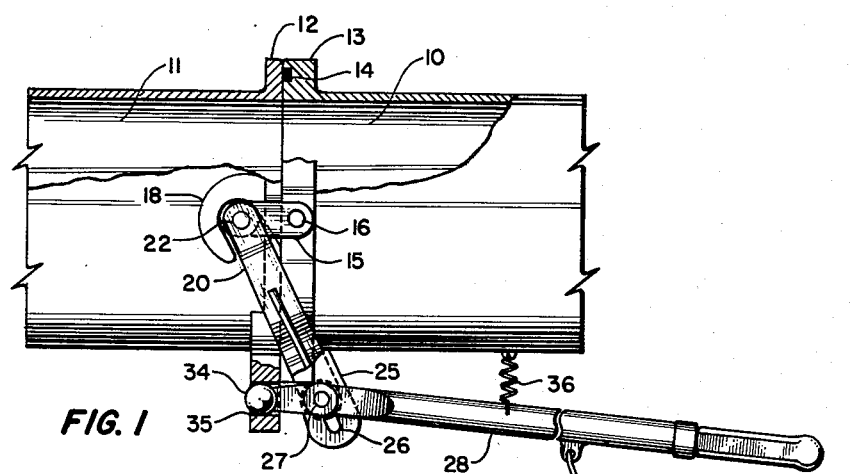

March 24, 1964 D. A. LEWIS 3,126,213
SELF-ADJUSTING, QUICK DISCONNECT CONNECTOR
Filed Aug. 8, 1961 3 Sheets-Sheet 1

INVENTOR.
DONALD A. LEWIS
BY
Earl C. Hancock
AGENT

INVENTOR.
DONALD A. LEWIS
BY
Earl C. Hancock
AGENT

March 24, 1964  D. A. LEWIS  3,126,213
SELF-ADJUSTING, QUICK DISCONNECT CONNECTOR
Filed Aug. 8, 1961  3 Sheets-Sheet 3

INVENTOR.
DONALD A. LEWIS
BY
Earl C. Hancock
AGENT

United States Patent Office 3,126,213
Patented Mar. 24, 1964

3,126,213
SELF-ADJUSTING, QUICK DISCONNECT
CONNECTOR
Donald A. Lewis, Littleton, Colo., assignor to Martin-Marietta Corporation, a corporation of Maryland
Filed Aug. 8, 1961, Ser. No. 130,011
4 Claims. (Cl. 285—61)

This invention relates to connectors having quick connect and disconnect features. More particularly, this invention relates to couplings for rapidly joining or separating sections of hose or pipe with a positive action and with the capability of automatically compensating for expansion or contraction of either or both of the sections after joining thereof.

In transferring liquids or gases from one location to another such as from a storage area to a vehicle, there are a number of requirements that must be met by the pipe or hose connection utilized. For instance, leakage from the connection should be kept at a minimum while ease of coupling and uncoupling must be maintained at a maximum. Many of the known devices which have been suggested are quite satisfactory for the gas and liquid transfer problems usually encountered in the past. For instance, flanged connectors with joining clamps have been used as have toggle lever arrangements and twist-to-lock devices. However, it has become necessary in many instances to provide a coupler or connector that not only can be rapidly joined and maintain a good seal after joining, but also the connector must often provide a positive break-away operation to overcome any residual sealing effects when uncoupling is desired. The break-away operation is especially important where materials are being transferred which might have a tendency to cause the interfaces of the connector to adhere to one another. There are also occasions when the connector must compensate for the contraction or expansion of its component parts in order to prevent loss of the seal during the transfer operation. All of the requirements presented hereinbefore in this paragraph have been emphasized by the increased industrial use of cryogenic materials such as liquid nitrogen, oxygen, hydrogen and so on. The increased usage of such materials naturally carries with it the problem of rapid and reliable transfer handling of the material.

Accordingly, the present invention provides a relatively simple, reliable and light weight connector for coupling tubular members having mating end faces thereon and is particularly useful for maintaining a good connection during transfer of extremely hot or extremely cold materials. The apparatus of the present invention is capable of being quickly coupled and uncoupled with a positive action and can automatically compensate for contraction or expansion of the pipe or tubing in the general area where they are being joined. The operation of the apparatus in accordance with this invention can be performed by hand or by a remotely controllable automatic arrangement. In addition, this invention can provide an automatic and positive disconnect function if there is any substantial movement of one part of the connector with respect to the other.

In particular, the present invention advantageously utilizes link connections rotatably mounted on one of the tubular members to be joined which is received by a camming device mounted on the other tubular member. The camming device has two opposed shoulders forming a groove for receiving a roller which is mounted on the link connection. When the roller is forced onto one of the shoulders, the link connection will be placed in tension thereby creating a compressive sealing force between the tubular members. Then the sealing force can be maintained by presenting a constant force on the roller relative to the shoulder. This constant force could be applied directly to the roller with the link connection remaining relatively free to rotate. Alternatively, a connecting arm could be provided which would form a rigid three-bar linkage with the link connection and the tubular member on which the link connection is rotatably mounted. Then the constant force means could be applied to the entire three-bar linkage in such a direction as to tend to force the roller up the shoulder. Whatever arrangement is employed, the force applying means associated therewith must be utilized in such a manner as to create and accommodate the displacement of one tubular member with respect to the other. In any event, the application of the constant force to the roller will cause a constant sealing force despite expansion or contraction of the tubular members on the connector components.

If the force applied to the roller is reversed so that the link connection will rotate and strike the other shoulder, a break-away or disconnecting force will be created between the tubular members by putting the link connection in compression. Thus the apparatus of this invention provides a positive self-compensating sealing feature and a positive disconnect or break-away feature all with the same apparatus.

The present invention can be modified to include any of several desirable features. For instance, a remotely controllable two-way actuator can be included with appropriate linkages to apply the constant sealing force or alternatively to apply the break-away or disconnect force. The actuator additionally can be mounted to be independent of motion of either of the tubular members so as to provide an automatic disconnect if the members become displaced due to motion away from the actuator. Further, a device can be included for quickly removing one of the tubular members with respect to the other after the disconnect operation is completed.

Figure 2:
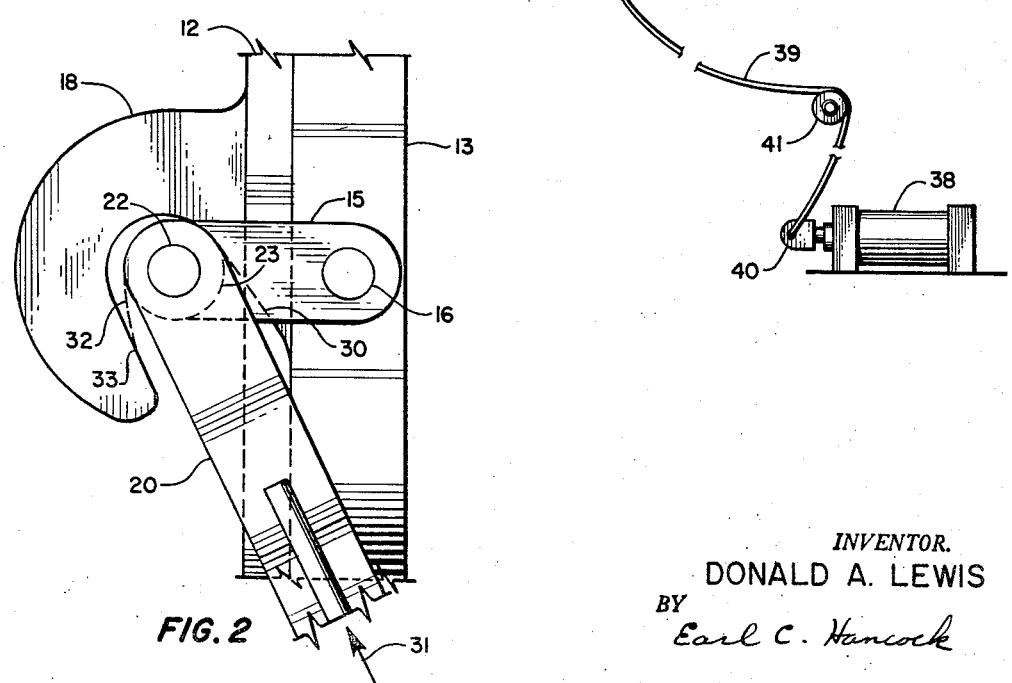
Figure 3:
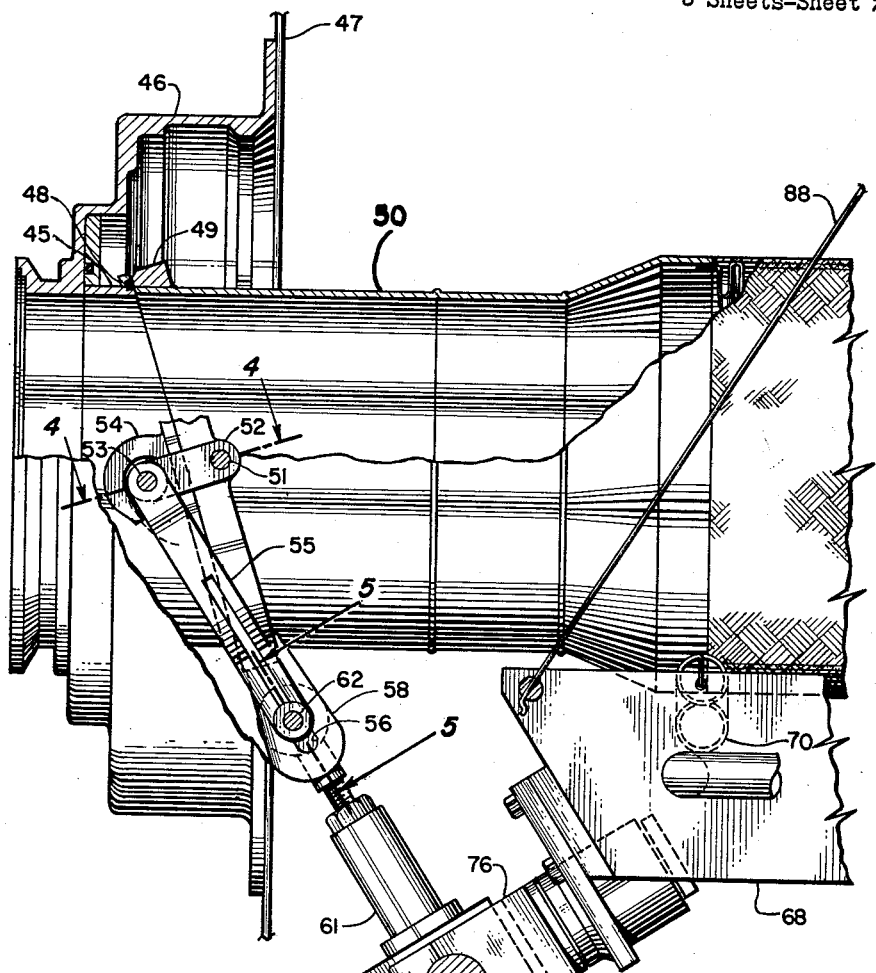
Figure 4:
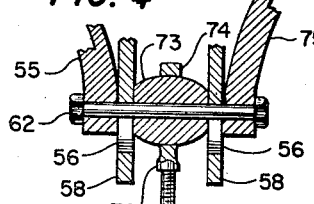
Figure 5:
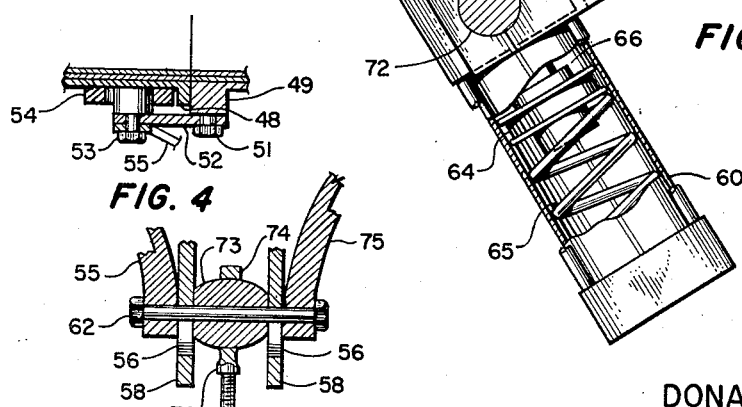
Figure 6:
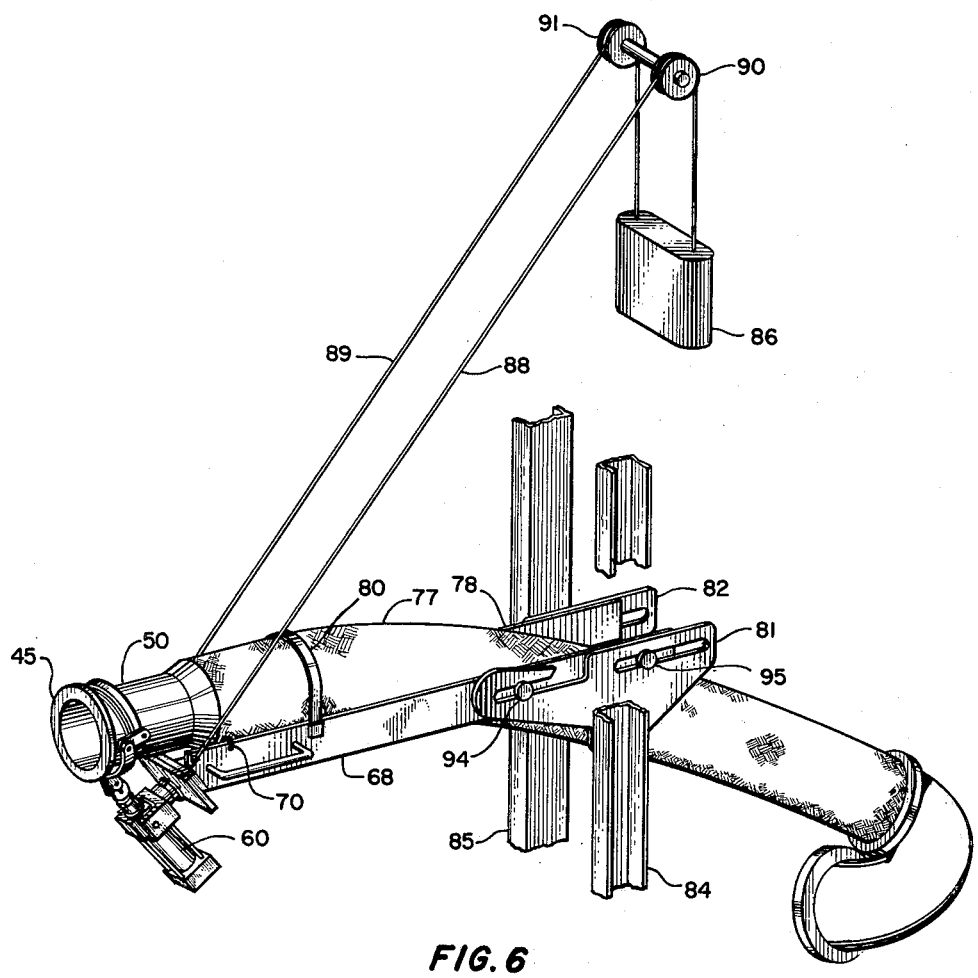

The novel features that are considered characteristic of this invention are set forth with particularity in the appended claims. The invention, however, both as to its organization and method of operation as well as additional features and advantages thereof will be best understood from the following description when read in connection with the accompanying drawings in which:

FIGURE 1 is a partially cut away side view of one embodiment in accordance with this invention, and FIGURE 2 is an enlarged view showing the relation of the sealing and break-away components shown in FIGURE 1, and FIGURE 3 is a partially cut away side view of another form of the present invention showing the detail of adaption thereof for a recessed connector arrangement, and FIGURE 4 is a section view showing the locked position of the cam and roller arrangement employed in FIGURES 1 and 3, and FIGURE 5 is a section view showing the relation of the yoke and clevis of FIGURE 3, and FIGURE 6 is a view showing the connector of FIGURE 3 with a rapid withdrawal feature.

FIGURE 1 reveals a connector arrangement in accordance with the present invention for joining tubular members 10 and 11 which have flanged mating end faces 12 and 13 thereon respectively. A groove for mounting O-ring 14 is included for purposes of perfecting the seal between members 10 and 11 after the coupling is completed. A link connection 15 is rotatably mounted on mounting pin 16 which is in turn rigidly attached externally to tubular member 10 on flanged end face 13. A camming means 18 is shown rigidly attached to member 11 near the flanged end face 12.

A connecting arm 20 is coupled to link connection 15 by a pin and roller arrangement 22 which is received in the groove defined by camming means 18. The interrelation of the camming means 18 and the other parts associated therewith will be more fully explained in conjunction with FIGURE 2 hereinafter. It is to be understood that there are counterparts to link 15, pin 16, camming means 18, arm 20 and pin and roller 22 on the hidden side of the connection shown in FIGURE 1, and it is to be further understood that the parts on the hidden side are interrelated and cooperate in substantially the same way as the parts actually shown and described. From this is can be seen that connecting arm 20 and its hidden counterpart form a yoke arrangement that converges at the bottom of the connector as shown in FIGURE 1.

A guiding means 25 having a groove 26 therein is rigidly attached to flanged end face 13 at a point in substantially quadrant relation with respect to pin 16 and to the counterpart of pin 16 on the hidden side of the connection. Connecting pin 27 is slidably retained in groove 26 and interconnects ends of connecting arm 20 and the connecting arm on the hidden side with lever arm 28. Thus the only direction of motion which can be imparted to the connecting arms and lever arm 28 at the point of their juncture via pin 27 is in a line generally towards or away from the axis of members 10 and 11.

FIGURE 2 shows the relation of the component parts of FIGURE 1 as interrelated for the purpose of providing the locking, self-compensating and positive break-away features. To accomplish the initial coupling of flanged end faces 12 and 13, the roller 23 of pin and roller arrangement 22 is introduced upward into the groove defined by the C-shape of camming means 18. Then as roller 23 rides up the sloped shoulder shown generally at 30, a mechanical advantage will be realized so that link 15 will be placed in tension by the major force component between shoulder 30 and roller 23 in the direction that will seal end faces 12 and 13 together.

The magnitude of the sealing force component can thereafter be maintained relatively constant by applying a constant force in the direction of arrow 31. In particular, assume that the coupling has been initially accomplished and cryogenic or supercool fluids are now being pumped through the connector. Flanged end faces 12 and 13 will tend to contract and pull away from one another so as to lose the seal therebetween. However, the constant force applied at 31 will force roller 23 further up shoulder 30 until equilibrium is again reached thereby compensating for the contraction of the members and maintaining the sealing force at a constant magnitude. If heated materials were pumped through the connector so that end faces 12 and 13 expand, roller 23 will back down shoulder 30 until equilibrium is again reached between the force components at the point of contact and the constant force 31. The foregoing explanation, of course, illustrates the self-compensating features of the present invention.

Next consider that the interfaces of flanged end pins 12 and 13 have become sealed together such as might occur from the adhesive characteristics of the material being transferred or, in the case of supercool or cryogenic material, from a build up of ice around the edges. Then by applying a force to arm 20 in the opposite direction from that shown by arrow 31, link 15 will rotate about pin 16 so that it will follow the arcuate course shown generally by dashed line 32 until striking camming means 18 at the sloped shoulder 33. From the mechanical advantage so realized, the major force component will be imparted to link 15 in the proper direction to cause a positive break-away force between end faces 12 and 13. Of course, roller 23 would simply slide out of the groove of camming means 18 during the uncoupling operation if there is no undesired sealing between faces 12 and 13. That is to say, the application of a retracting force (i.e.: in the opposite direction of arrow 31) to arm 20 will simply cause the end face 13, link 15 and arm 20 to retract more or less as a unit.

Returning to FIGURE 1, note that lever arm 28 is slidably and rotatably retained in groove 35 by ball 34. In accordance with the illustrative example of FIGURE 1, the constant force to be applied to arm 20 is supplied by spring 36. Spring 36 could be replaced by any of a number of arrangements that will be readily apparent to those having normal skill in the art. For instance, an actuator could be supplied that would push upward on arm 28 or the upward force could be supplied by simply pulling up on lever arm 28 by hand if this should be desirable.

If the applied constant force should cause connecting pin 27 to hit the upper limit of groove 26, then connecting arm 20, link connection 15, end face 13 and guiding means 25 would in effect become a rigid three-bar linkage which is all being forced upwards by the constant force. If the sealing force should thereafter be threatened by virtue of contraction of the tubular members or the like, then the roller will be forced up the shoulder by the rigid three-bar linkage which action will also cause a force component in such a manner that end face 13 will slip slightly with respect to end face 12.

When uncoupling is to be accomplished, a downward force is to be applied to lever arm 28. This can be done by hand or by actuator 38 which is connected to lever arm 28 by the wire or cord 39. In the apparatus shown in FIGURE 1, actuator 38 will force shaft 40 outward thereby pulling cord 39 around pulley 41 thus imparting a downward force component to lever arm 28. Connecting arm 20 will then be forced downward in groove 26 causing link 16 to rotate and provide the break-away force as described for FIGURE 2. It should be noted that the angle of pull of cord 39 will also cause a backward force component on lever arm 28 which will disengage ball 34 from groove 35 and pull member 10 away from member 11 after roller and pin arrangement 22 has cleared the groove of the camming means 18. There are many possible arrangements for performing the operation of actuator 38 such as by hand or by a wind-up motor which would rotate shaft 40 instead of extending it or by a counter-weight system.

FIGURE 3 is another illustrative example of the present invention which particularly shows an arrangement thereof for allowing one of the tubular connector members 45 to be recessed. FIGURE 3 also illustrates some additional self-adjusting and remote control features allowing for greater flexibility. As can be seen in FIGURE 3, tubular member 45 is mounted within recess 46 so that no part thereof extends beyond the surface 47 of the receiving vehicle after the connector has been uncoupled. Flanged end faces 48 and 49 of tubular members 45 and 50 respectively are sloped for the purpose of accommodating the sealing and break-away components while maintaining the size of recess 46 at a minimum. It should be understood that the end faces 48 and 49 could be vertical if this should be desired but either member 45 would have to protrude from the surface of the vehicle or else recess 46 would have to be enlarged to accommodate the mechanisms associated with member 50. The relationships and operation of mounting pin 51, link connection 52, roller and pin arrangement 53, camming means 54, and connector arm 55 are substantially the same as described in FIGURES 1 and 2. Accordingly, a detailed description of these components will be omitted for purposes of clarity. It should be noted, however, that the rigid three-bar arrangement explained for FIGURE 1 could apply as well to FIGURE 3.

The yoke comprising connector arm 55 and its counterpart hidden on the other side of the connector are slidably retained in groove 56 of clevis 58. Pin 62 retains the yoke assembly within groove 56 and also has a spherical bearing mounted thereon for coupling the eye arrangement on the end of shaft 61 thereto. The relationships of the eye and spherical bearing will be better understood in considering FIGURE 5 hereinafter.

Actuator 60 is coupled to the yoke via shaft 61 which is in turn connected to piston 64 mounted within actuator 60. Piston 64 is forced upward by spring 65 thereby imparting a relatively constant sealing force to the yoke. Whenever uncoupling is desired, gas under pressure can be introduced to the upper chamber 66 of actuator 60 thereby forcing piston 64 downward and accomplishing the break-away operation. Actuator 60 is rotatably coupled to frame 68 which is relatively rigid with respect to members 45 and 50. There is another frame similar to 68 on the other side of member 50, this hidden frame being connected to frame 68 by spring 70 thereby providing a resilient cradle for member 50. From this it can be seen that the forces caused by actuator 60 during the sealing and break-away operations do not transmit any undesirable bending loads of any consequence to either of the tubular members 45 and 50. That is to say, tubular member 50 is relatively free-floating with respect to actuator 60.

FIGURE 4 shows the cam 54 and roller 53 arrangement of FIGURES 1 and 3 in the locked position and shows the relation of roller 53 somewhat more clearly than is shown for its counterpart in FIGURE 2. However, the interrelation of the components of FIGURE 4 is substantially the same as in FIGURE 2. Accordingly, a detail description of FIGURE 4 will be omitted.

FIGURE 5 illustrates the components employed in FIGURE 3 for coupling actuator 60 to the yoke. Connector arm 55 and the connector arm 75, the latter arm being hidden in the view shown in FIGURE 3, are coupled through the groove 56 of clevis 58 by means of pin 62. Also mounted on pin 62 between the arms of clevis 58 is spherical bearing 73. Surrounding spherical bearing 73 is eye 74 on the end of shaft 61. Thus if tubular members 45 and 50 are slightly misaligned with respect to frame 68 and its hidden counterpart as shown in FIGURE 3, then eye 74 will rotate about spherical bearing 73 and compensate for this misalignment. In this respect, it should be noted that actuator 60 is pivotally mounted about gimbal 76.

Assuming in FIGURE 3 that the tubular member 45 is mounted on a vehicle that is to receive a fluid and that tubular member 50 is connected by flexible tubing to a storage tank, it will be appreciated that any slight movement of the vehicle will not effect the connector or its seal. That is, any slight sidewards motions will be compensated for by the bearing 73, eye 74 and gimbal 76 arrangement while slight upward movements of the vehicle will be compensated for by the rotational mounting of actuator 60 about pin 72 with accompanying extensions or retractions of shaft 61. If there should be any substantial motion of the vehicle upwards or sidewards, then the shaft 61 will become fully extending and pin 62 will be pulled downward in groove 56 thereby effecting the disconnect operation. If a disconnect should be desirable due to excessive downward motion of the vehicle, then any of a number of devices could be employed. For instance, a pressure sensitive switch could be mounted between member 50 and actuator 60 which would release pressurized gas into chamber 66 or a limit switch could be associated with shaft 61 to cause the release before the shaft is forced into the fully retracted position and so on.

FIGURE 6 illustrates an arrangement for providing a rapid withdrawal or fly-away feature for use with the present invention. By way of illustrative example only, the general components of the connector described for FIGURE 3 are shown in FIGURE 6 but some of the detail and a detailed description of the connector are both omitted.

In FIGURE 6, tubular connector member 50 is shown as attached to a section of flexible hose 77 which is ultimately attached to a storage tank not shown. The particular hose 77 shown is an insulated or vacuum jacketed line for use with cryogenic liquids but the invention is not so limited, of course. Frames 68 and 78 form a supporting boom in conjunction with spring 70 for hose 77. Spring 70 is connected between the two frames under the hose. Resilient strap 80 restrains hose 77 from undesired upward motion and is connected to the two frames 68 and 78 as is spring 70. Frames 68 and 78 are slidably retained by end plates 81 and 82 respectively, the end plates being rigidly attached to supporting channel beams 84 and 85. Counterweight 86 is connected to frames 68 and 78 via cables 88 and 89 over pulleys 90 and 91.

After the connector has been uncoupled in accordance with the operation described for FIGURE 3, the backward component created by counterweight 86 will pull frames 68 and 78 away from connector 45 by sliding the mounting pins on the frames, such as are shown at 94 and 95 for frame 68, backward in the slots of the end plates. This will clear member 50 from member 45. Member 45 remains attached to the vehicle, of course. Then after pin 94 has passed the end of the retaining portion of the groove in which it is mounted, the upward component force from counterweight 86 would take over and the support boom would swing up around pin 95 and its hidden counterpart for frame 78 thereby providing a substantial clearance between the vehicle and the storage area.

Although the foregoing exemplary embodiments have been described with great particularity, the present invention is not intended to be limited thereto. In fact, many variations of the elements of this invention will be obvious to one having normal skill in the art without departing from the spirit of this invention. For instance, actuator 60 could be fully pneumatic or hydraulic instead of semi-spring actuated. Also the counterweight shown in FIGURE 6 could be replaced by a simple linear actuator for withdrawing hose 77 without any upward motion. Further, the roller 23 and pin 22 shown in FIGURE 2 need not be connected to the link 15 and connecting arm 20 at the same point. That is to say, an additional mechanical advantage could be realized by extending link 15 and having roller 23 mounted thereon somewhere between pin 22 and pin 16. Additionally, the members to be connected have been described herein as having flat mating end faces but there are obvious arrangements within the spirit of this invention in which the mating end faces could be of the bayonet or male-female type. It would also be possible to mount actuator 60 directly on tubular member 50 in FIGURE 3.

What I claim is:

1. An apparatus for detachably coupling first and second tubular members having mating end faces comprising first and second mounting pins each rigidly attached externally to said first member near the said end face thereof and extending in a generally radial direction from substantially diametrically opposed points, first and second link connections each having one end thereof rotatably mounted on said first and second mounting pins respectively, a yoke arrangement including first and second connecting arms and a shaft all converging at a common juncture, first and second means for coupling each of said connecting arms to the other end of a respective one of said link connections, a clevis rigidly mounted in a radial direction externally to said first member in a generally quadrant location with respect to said mounting pins and having a groove therein for slidably retaining said common juncture for allowing movement thereof only in a direction that will impart rotational motion to said link connections, first and second generally C-shaped camming devices mounted externally on said second tubular member near the said end face thereof and at generally diametrically opposed locations, the planes of said C-shaped members being generally parallel with respect to one another and with respect to the axis of said second member, first and second roller means coupled to said first and second link connections respectively, the grooves defined by said first and second C-shaped members being designed to receive said first and second rollers respectively, the grooves in said C-shaped members each having a first shoulder for coacting with said roller means for imparting a closing force to said members whenever said link connections are forced in a direction tending to cause rotation thereof generally away from said clevis, the grooves in said C-shaped members each having a second shoulder for coacting with said roller means for imparting a break-away force to said members whenever said link connection rotates in a direction generally toward said clevis, and an actuator pivotably mounted so as to be independent of motion of said first member at the pivot point, said actuator being connected to said shaft for selectably positioning said common juncture within said groove of said clevis thereby selectably supplying forces between said roller means and said C-shaped members.

2. Apparatus in accordance with claim 1 which includes a rod for retaining said connecting arms with respect to the groove of said clevis, and a generally spherical member mounted on said rod for retaining said shaft with respect to the direction of the groove of said clevis while allowing rotational motion of said shaft in directions substantially perpendicular with respect to the axis of said first member.

3. Apparatus in accordance with claim 1 which includes means for selectably withdrawing said first member and said actuator from proximity with said second member thereby providing a positive quick disconnect between said tubular members.

4. An apparatus for detachably coupling first and second tubular members having mating end faces comprising;
(a) first and second mounting pins each rigidly attached externally to said first tubular member, said mounting pins being substantially diametrically opposite one another on said first member,
(b) first and second link connections each rotatably mounted on said first and second mounting pins respectively,
(c) first and second roller means attached to said first and second link connections respectively,
(d) first and second camming devices rigidly mounted at substantially diametrically opposite points on said second tubular member, each of said camming devices having first and second surfaces at least slightly sloped with respect to the center line of said second tubular member so as to define a channel therebetween for receiving one of the said roller means,
(e) actuating means selectably operable for applying forces that will tend to rotate said link connections (1) in a first direction for forcing said rollers against said first surface thereby creating a closing force between said tubular members and (2) in an opposite direction for forcing said rollers against said second surface thereby creating a break-away force between said tubular members,
(f) said actuating means including a pair of connecting arms each rotatably attached at one end thereof to respective ones of said link connections,
(g) guiding means rigidly mounted externally near the said end face of said first tubular member at a generally quadrant point with respect to said mounting pins, said guiding means having a groove therein, and
(h) means for slidably retaining said connecting arms in said groove, said groove permitting movement of said connecting arms only in a direction that will tend to cause rotation of said link connections about said mounting pins thereby establishing a rigid 3-bar linkage between said first member, said link connections and said connecting arms whenever said actuating means has caused said connecting arms to reach the end of said guiding means groove in the said first direction,
(i) whereby the end faces of said tubular members will be maintained in a sealed condition whenever said actuator means forces said rollers in said first direction whereas a break-away force can be selectably realized whenever said actuator means forces said roller means in the opposite direction.

References Cited in the file of this patent

UNITED STATES PATENTS

| 1,782,062 | Erickson | Nov. 18, 1930 |
| 2,256,845 | Lanninger | Sept. 23, 1941 |
| 2,453,480 | Williamson et al. | Nov. 9, 1948 |
| 2,634,927 | Smith | Apr. 14, 1953 |

FOREIGN PATENTS

| 878,139 | Germany | June 1, 1953 |